(12) United States Patent
Mercer et al.

(10) Patent No.: US 9,929,653 B1
(45) Date of Patent: Mar. 27, 2018

(54) MULTI-LEVEL BUCK CONVERTER WITH MULTIPLE CONTROL LOOPS AND FLYING CAPACITOR REGULATION

(71) Applicant: DIALOG SEMICONDUCTOR (UK) LIMITED, London (GB)

(72) Inventors: Mark Mercer, Phoenix, AZ (US); Aravind Mangudi, Phoenix, AZ (US); Holger Petersen, Germering (DE)

(73) Assignee: DIALOG SEMICONDUCTOR (UK) LIMITED, London (GB)

( * ) Notice: Subject to any disclaimer, the term of this patent is extended or adjusted under 35 U.S.C. 154(b) by 0 days.

(21) Appl. No.: 15/627,280

(22) Filed: Jun. 19, 2017

(51) Int. Cl.
| | | |
|---|---|---|
| *H02J 3/12* | (2006.01) | |
| *G05F 1/00* | (2006.01) | |
| *H02M 3/158* | (2006.01) | |
| *H02M 1/08* | (2006.01) | |
| *H02M 1/00* | (2006.01) | |

(52) U.S. Cl.
CPC ............. *H02M 3/158* (2013.01); *H02M 1/08* (2013.01); *H02M 2001/0025* (2013.01)

(58) Field of Classification Search
CPC .............................. G05F 1/595; H02M 3/158
USPC ....... 323/242, 243, 246, 274, 275, 283, 284, 323/288
See application file for complete search history.

(56) References Cited

U.S. PATENT DOCUMENTS

| | | | |
|---|---|---|---|
| 9,160,232 B2 | 10/2015 | Thomas et al. | |
| 2010/0231189 A1* | 9/2010 | Chen ................... | H02M 3/1582 323/284 |
| 2011/0234193 A1* | 9/2011 | Laur ................... | H02M 3/1584 323/311 |
| 2013/0038301 A1* | 2/2013 | Ouyang ............... | H02M 3/156 323/271 |
| 2013/0181692 A1* | 7/2013 | Lee ........................... | G06F 1/26 323/271 |
| 2014/0266135 A1* | 9/2014 | Zhak ....................... | H02M 1/36 323/311 |
| 2015/0303802 A1* | 10/2015 | Childs ................... | H02M 3/158 323/271 |
| 2016/0118887 A1 | 4/2016 | Zhang et al. | |

* cited by examiner

*Primary Examiner* — Gary Nash
(74) *Attorney, Agent, or Firm* — Haynes and Boone, LLP

(57) ABSTRACT

A multi-level buck converter is provided with multiple control loops to regulate the output voltage across a wide duty cycle range while also regulating the flying capacitor voltage.

20 Claims, 7 Drawing Sheets

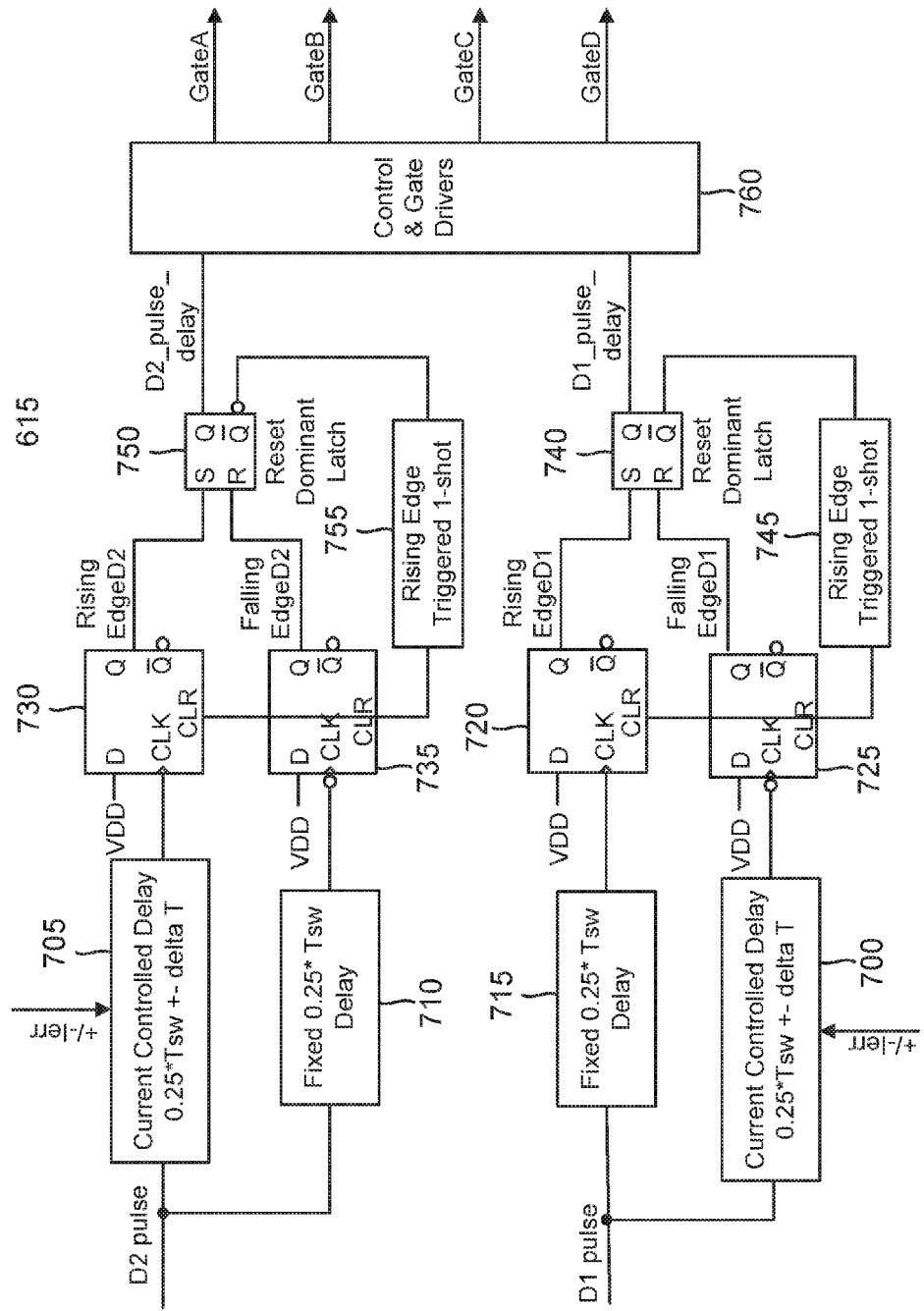

MULTI-LEVEL BUCK CONVERTER WITH MULTIPLE CONTROL LOOPS AND FLYING CAPACITOR REGULATION

TECHNICAL FIELD

The present invention relates to a multi-level buck converter, and more particularly to a multi-level buck converter with multiple control loops for regulating the output voltage while also regulating the flying capacitor voltage.

BACKGROUND

As compared to a conventional buck converter, a multi-level buck converter has several advantages such as increased efficiency at high load states. In addition, the additional switches in multi-level buck converters in combination with the flying capacitor voltage being one half the input voltage lower the switching stresses as compared to conventional buck converters. Moreover, the ripple is reduced as the four switches in multi-level buck converters produce twice the ripple frequency as compared to the ripple frequency at the same switching speed for a conventional (single-phase) buck converter such that the switching frequency is effectively doubled for a multi-level buck converter. This increase in output ripple frequency advantageously enables a multi-level buck converter to use a smaller inductor as compared to a conventional buck converter.

Although multi-level buck converters thus offer advantageous properties over conventional buck converters, the control of the multiple switches for a multi-level buck converter is problematic. In general, there are four switching states for a four-switch multi-level buck converter as shown in FIG. 1. In each switching state, only two switch transistors are on from a set of four switch transistors: a switch transistor A, a switch transistor B, a switch transistor C, and a switch transistor D. In a switching state D1, switch transistors A and C are on such that the flying capacitor voltage $V_{CF}$ is charged by the input voltage and drives the switch node voltage $V_{SW}$ at the input of the inductor. The resulting inductor current $I_{SW}$ charges an output capacitor with the output voltage $V_{OUT}$. In a switching state DV, switch transistors C and D are on such that the inductor freewheels and discharges into the output capacitor. The flying capacitor floats during switching state DV. In a switching state D2, switch transistors D and B are on such that the flying capacitor discharges into the switch node. Finally, switch transistors A and B are on in a switching state DP such that the switch node is charged to the input voltage $V_{IN}$. The flying capacitor floats during switching state DP.

As compared to a conventional buck converter, the root-mean-square (RMS) switching node voltage $V_{SW}$ at the input node to the inductor is reduced by 50%. In particular, it can be shown that the $V_{SW}$ will switch between the input voltage $V_{IN}$ and one-half of the input voltage if the output voltage is greater than one-half of the input voltage. Conversely, $V_{SW}$ will switch between $V_{IN}/2$ and ground if $V_{IN}/2$ is greater than $V_{OUT}$. This reduction in the switch node voltage swing also reduces the switching voltage stresses on the switching transistors. Given the reduced voltage stress, the breakdown voltage ratings for the switching transistors may be reduced as compared to conventional buck converter switch transistors. Multi-level buck converters thus offer reduced conduction losses for its switch transistors.

But these advantages come at the cost of increased regulation complexity as plainly shown by the four switching states discussed above with regard to FIG. 1. Despite this increased complexity, prior-art multi-level buck converters have typically employed conventional buck converter control techniques such as valley-mode or peak-mode (peak-current) control. But the transition between valley-mode and peak-mode control in a multi-level buck converter creates a number of control stability issues that are not present in standard buck converters. In particular, note that a transition from peak to valley-mode control is typically unnecessary in a conventional buck converter over a wide range of operating conditions. But conventional multi-level buck converters that use current-mode control to maintain an amps-seconds balance on the flying capacitor transition between valley-mode and peak-current control when the duty cycle ranges from less than 50% to greater than 50% (the duty cycle being defined as the ratio of the output voltage to the input voltage). It is thus conventional to limit multi-level buck converter control to just one of the valley-mode and peak-current control modes. But such a control limitation in turn limits the duty cycle range. There is thus a need in the art for improved multi-level buck converter having a regulation over a wide input voltage range.

The restriction in operating range is not the only issue facing conventional multi-level buck converters. In addition, multi-level buck converters suffer from non-ideal flying capacitor voltage levels. Given its topology, the flying capacitor voltage will ideally average to $V_{IN}/2$. Similarly, the switch node voltage will average to $V_{IN}/2$ for switching states D1 and D2. In contrast, the switch node voltage is grounded in switching state DV and equals $V_{IN}$ in switching state DP. Given these three possible voltage values, a multi-level buck converter such as illustrated in FIG. 1 may also be denoted as a three-level buck converter. The sum of the D1 and D2 switching state periods times the (ideal) flying capacitor voltage $V_{IN}/2$ equals the output voltage. As noted earlier, the ratio of the output voltage to the input voltage for a multi-level buck converter may be deemed to define a duty cycle ratio D such that $D=V_{OUT}/V_{IN}$. Assuming that flying capacitor voltage $V_{CF}$ is one half of the input voltage, the duty cycle D thus equals one half the sum of the D1 and D2 switching periods. Under ideal conditions, the flying capacitor voltage will self-regulate to $V_{IN}/2$ but imbalances due to differences in parasitic elements such as the switch capacitance causes the flying capacitor voltage to drift towards ground or towards $V_{IN}$. Either outcome significantly impairs the multi-level buck controller from regulating the output voltage. Moreover existing schemes to regulate the flying capacitor voltage complicate the output voltage regulation. Accordingly, there is a need in the art for improved multi-level buck converters that may be regulated over a wide $V_{IN}$ to $V_{OUT}$ ratio (a broad duty cycle range) while also regulating the flying capacitor voltage.

SUMMARY

A multi-level buck converter is provided with two ramp signal generators. A first error amplifier provides a first error signal responsive to a difference between an output voltage and a first reference voltage. A second error amplifier provides a second error signal responsive to a difference between a flying capacitor voltage and a second reference voltage. A controller controls the switching states for the multi-level buck converter responsive to a comparison of the first and second ramp signals to the first error signal and responsive to the second error signal to regulate an output voltage for the multi-level buck converter while regulating the flying capacitor voltage.

These and additional advantageous features for the disclosed multi-level buck converters may be better appreciated through consideration of the following detailed description.

BRIEF DESCRIPTION OF THE DRAWINGS

FIG. 7 illustrates further details for the controller in the multi-level buck converter of FIG. 6.

DETAILED DESCRIPTION

Figure 2:
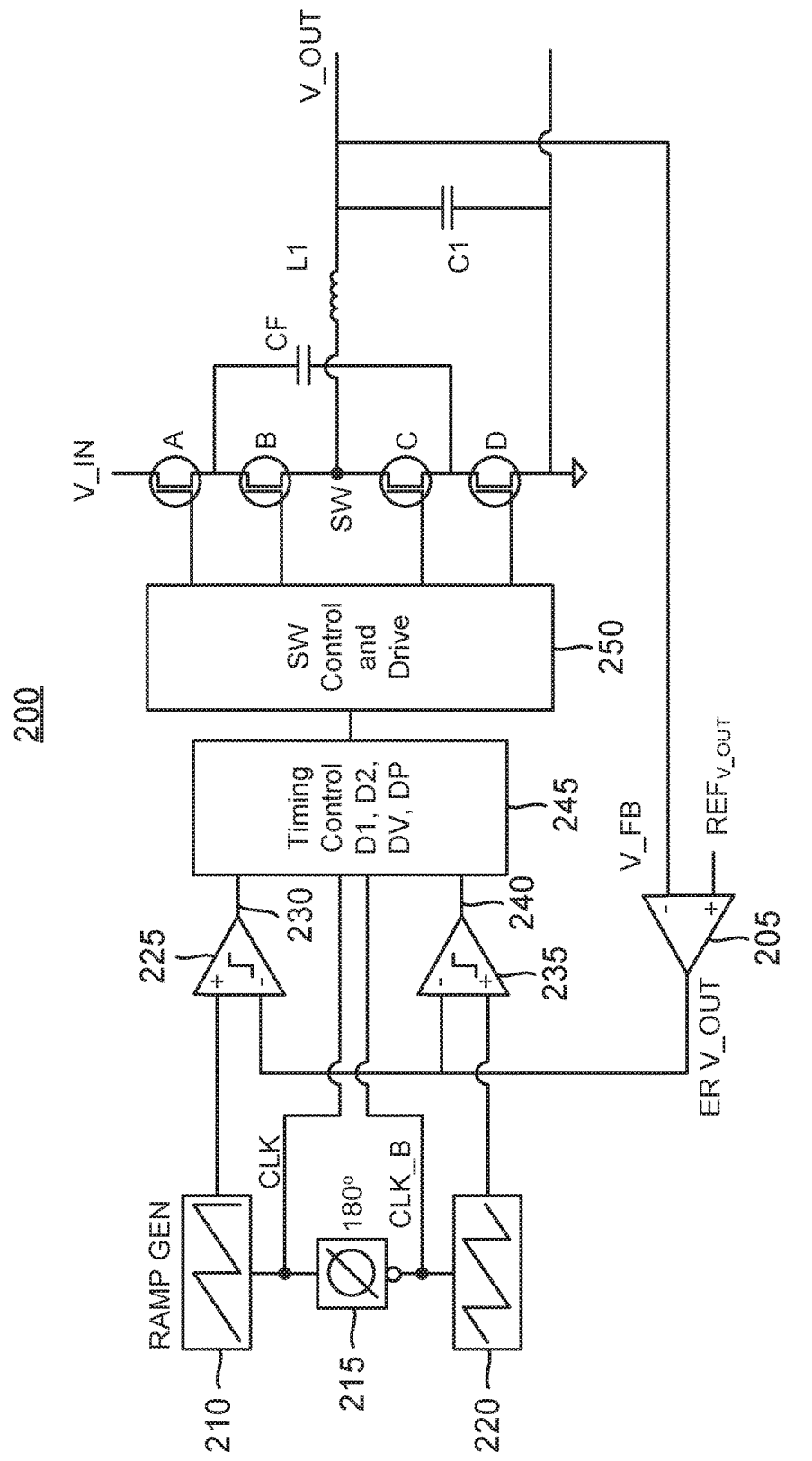
FIG. 2 is a diagram of a multi-level buck converter in accordance with an aspect of the disclosure.

An improved multi-level buck converter is provided that seamlessly regulates output power over a broad range of duty cycles. An example multi-level buck converter 200 for such seamless regulation is shown in FIG. 2 that includes switch transistors A, B, C, and D arranged in a conventional fashion. In particular, switch transistor A has a first terminal connected to a node for the input voltage V_IN and a second terminal connected to a first terminal for a flying capacitor CF. In addition, the second terminal for switch transistor A connects to a first terminal for switch transistor B. As used herein, a transistor "terminal" refers to, for example, a drain or source terminal for a MOS field-effect-transistor. A second terminal for switch transistor B connects to a switch (SW) terminal for an inductor L1 that connects to an output capacitor C1 for smoothing the output voltage V_OUT. Switch transistor C has a first terminal connected to the SW node (the input node for inductor L1) and a second terminal connected to a remaining terminal for the flying capacitor CF. In addition, the second terminal for switch transistor C connects to a first terminal of switch transistor D that in turn has a second terminal connected to ground.

Figure 1:
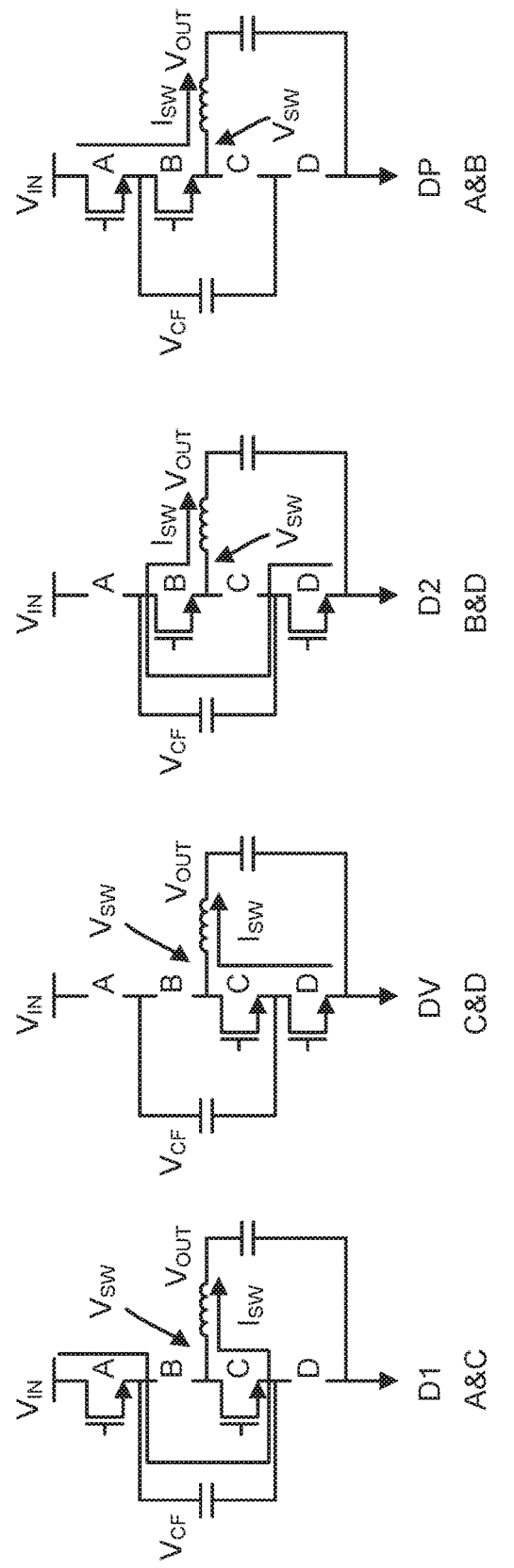
FIG. 1 illustrates the four switching states for a conventional four-switch multi-level buck converter.

An error amplifier 205 generates an error voltage (ER V_OUT) responsive to a difference between the output voltage and a reference voltage (REF$_{V\_OUT}$). The error voltage is compared to two ramp signals that are 180° out of phase with each other (note that other phase relationships may be used in alternative embodiments). A first ramp generator 210 generates a first ramp signal responsive to a clock from a clock source 215. A second ramp generator 220 generates a second ramp signal responsive to an inverted clock signal from clock source 215. The second ramp signal is thus 180° out of phase with the first ramp signal. A first comparator 225 compares the first ramp signal to the error signal to generate a first control signal 230. Similarly, a second comparator 235 compares the second ramp signal to the error signal to generate a second control signal 240. A timing control logic circuit 245 determines the timings for the D1, D2, DV, and DP switching states (discussed with regard to FIG. 1) responsive to first control signal 230 and second control signal 240 as further discussed herein. A switching control and drive circuit 250 drives the gates of switch transistors A, B, C, and D to effect the switching state selected by timing control logic circuit 245. For example, if timing control logic circuit 245 indicates that switching state D1 should be asserted, switch control and drive circuit 250 switches on switch transistors A and C by driving their gates with the appropriate voltages. If switch transistors A and C are NMOS transistors, switch control and drive circuit 250 charges their gates to switch these transistors on. At the same time, the gates of switch transistors B and D would be discharged. The charging and discharging would be reversed in a PMOS switch transistor embodiment.

Figure 3:
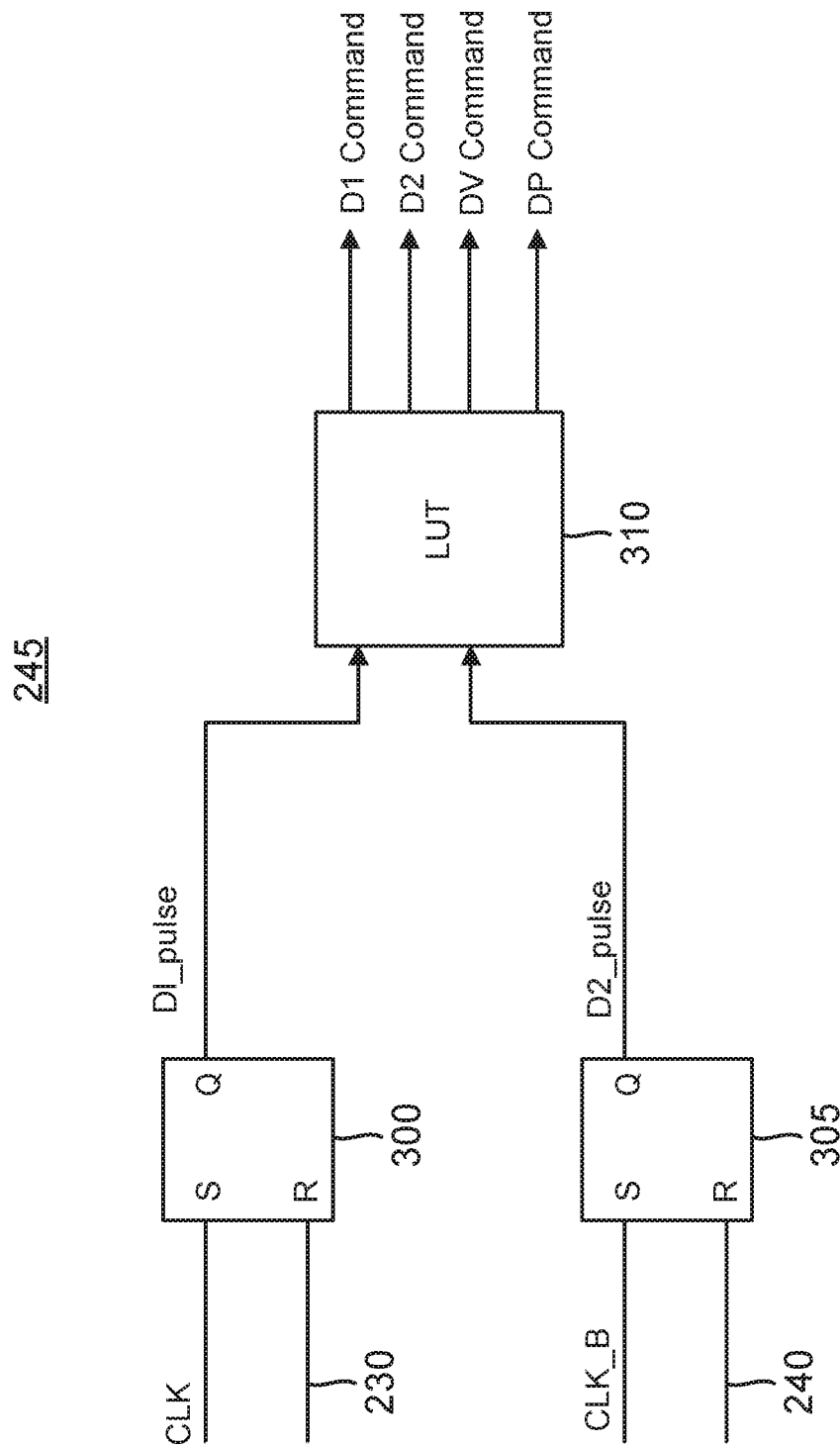
FIG. 3 illustrates additional details for the timing control circuit in the multi-level buck converter of FIG. 2.

An example of timing control logic circuit 245 is shown in more detail in FIG. 3. A first flip-flop 300 sets (asserts) a first signal designated as D1_pulse in response to a rising edge for the clock signal (designated as CLK) from clock source 215 (FIG. 2). Flip-flop 300 resets the D1_pulse signal in response to the assertion of first control signal 230 from first comparator 225 (FIG. 2). The D1_pulse signal will thus be asserted at the start of the ramp period for the first ramp signal and de-asserted when the first ramp signal is greater than the error signal from differential amplifier 205 (FIG. 2). A second flip-flop 305 sets a second signal designated as D2_pulse in response to a rising edge for the inverted clock signal (designated as CLK_B) from clock source 215. Flip-flop 305 resets the D2_pulse signal in response to the assertion of second control signal 240 from second comparator 235 (FIG. 2). The D2_pulse signal will thus be asserted at the start of each period for the second ramp signal and de-asserted when the second ramp signal is greater than the error signal.

As used herein, a signal such as signals D1_pulse and D2_pulse is deemed to be asserted or set when is has a logic true value, regardless of whether the logic convention is logic-high or logic-low. Similarly, a signal is deemed herein to be de-asserted or reset when it has as logic false value. As used herein, a signal that is "on" is deemed to be asserted whereas a signal that is "off" is deemed to be de-asserted. There are thus four possible on and off combinations for the logic states for the D1_pulse and D2_pulse signals. These four logical states may be mapped to the switching states D1, D2, DP, and DV in a look-up table (LUT) 310 as follows. Should the D1_pulse signal be on and the D2_pulse signal be off, LUT 310 asserts a command to select for the D1 switching state. Conversely, should the D2_pulse signal be on while the D1_pulse signal is off, LUT 310 asserts a command to select for the D2 switching state. If both signals are off, LUT 310 asserts a command to select for the DV switching state. Finally, if both signals are on, LUT 310 asserts a command to select for the DP switching state. The resulting operating rules coded into LUT 310 are summarized in the following table:

| Switching State | D1_pulse | D2_pulse |
|---|---|---|
| D1 | ON | OFF |
| D2 | OFF | ON |
| DV | OFF | OFF |
| DP | ON | ON |

Figure 4:
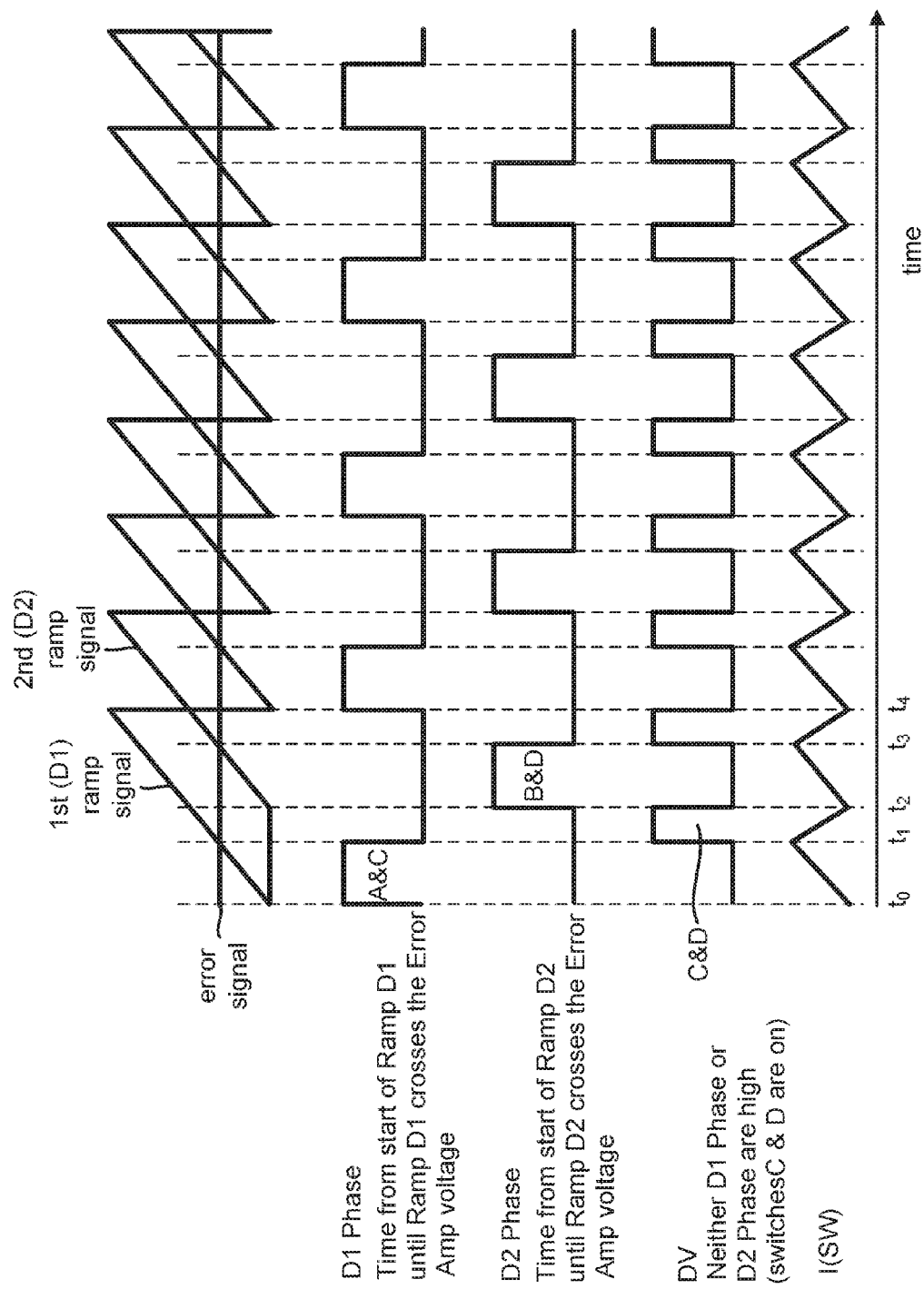
FIG. 4 illustrates the ramp signal waveforms and resulting switching states for the multi-level buck converter of FIG. 2 in response to the error signal being less than a mid-level for the ramp signals.

The resulting control depends upon the duty cycle, which in turn determines whether the error signal is less 50% or greater than 50% of a mid-point of the peak voltage for the two ramp signals (one-half of the peak voltage). An example of the ramp waveforms for an error signal that is less than 50% of the ramp signals' mid-point voltages is shown in FIG. 4. The first ramp signal begins a period at a time t0 at which point the first ramp signal continues to increase until it is greater than the error signal at a time t1. The second ramp signal does not start its period until a time t2. The D1_pulse signal discussed with regard to FIG. 3 is thus on from time t0 to time t1 whereas the D2_ pulse signal is off. The D1 switching state is therefore asserted from time t0 to t1. Between times t1 and t2, both signals D1_pulse and D2_pulse will be off such that the DV switching state is asserted from time t1 to time t2. At time t2, the D2_pulse signal is asserted until it is de-asserted when the second ramp signal is greater than the error signal at a time t3. The first ramp signal does not begin another period until a time t4. Thus, the D2_pulse signal will be on and the D1_pulse signal will be off from times t2 to t3 such that the D2 switching state is asserted during this period. It may thus be seen that the switching states will continue to cycle in this pattern of D1 to DV to D2 as long as the error signal is below the mid-point of the two ramp signals. Another such cycle will begin at time t4 with the D1 switching state. The current into the switching node I(SW) increases during the D1 switching state as the input voltage is charging the flying capacitor. During the DV switching state, the current I(SW) declines as the inductor freewheels. During the D2 switching state, the current I(SW) again increases as the flying capacitor discharges into the switching node SW.

Figure 5:
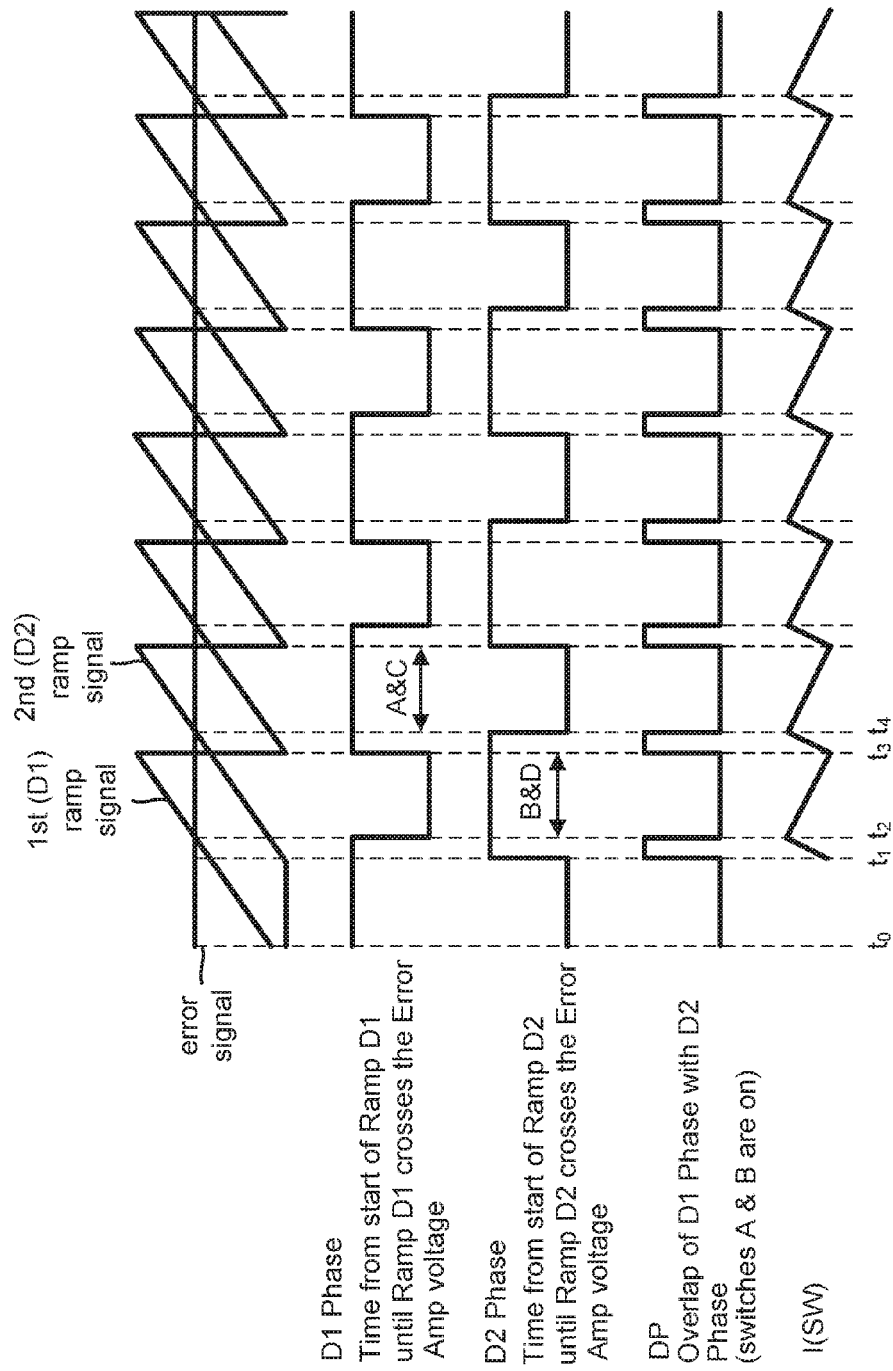
FIG. 5 illustrates the ramp signal waveforms and resulting switching states for the multi-level buck converter of FIG. 2 in response to the error signal being greater than a mid-level for the ramp signals.

Should the error signal increase beyond the mid-point for the ramp signals, the control disclosed herein produces the waveforms shown in FIG. 5. Because the ramp waveforms are 180° degrees out of phase with each other and the error signal is above their mid-points, a ramp signal starting from the beginning of a ramp period cannot increase above the error signal before the remaining ramp signal starts another period. For example, the first ramp signal begins a period at a time t0. Given the phase relationship to the second ramp signal, the first ramp signal will reach its mid-point at time t1 when the second ramp signal begins its period. But the error signal lies above the mid-point so from time t1 until the first ramp signal passes the error signal at a time t2, both the D1_pulse and the D2_pulse signals will be on. From time t0 to time t1, only the D1_pulse signal is on such that the D1 switching period is asserted between times t0 and t1. From time t1 to time t2, the DP switching state is asserted. Since the D1_pulse signal is switched off after time t2 until the start of its next period at a time t3, the D2 switching state is asserted from time t2 until time t3. From time t3 to a time t4, both the D1 and D2 phases are on such that the DP switching state is selected. The cycle of D1 to DP to D2 to DP would then repeat such that the D1 switching state is asserted at time t4. Given the increase in the error signal, both the D1 and D2 switching states are de-magnetizing such that switching current I(SW) declines during these switching states. In contrast, the DP switching state is a magnetizing state such that the switching current I(SW) increases during the DP switching state.

Should the error signal transition across the mid-point, it can be seen that the D1 and D2 switching states will have essentially a 50% duty cycle. If the error signal drops slightly below the mid-point of the ramp signals, small periods of the DV switching state will occur whereas small periods of the DP switching states will occur as the error signal increases slightly over the mid-point. Proper output voltage regulation is thus advantageously provided across the range of error signal amplitudes and also across a wide duty cycle range for the disclosed multi-level buck converter.

Figure 6:
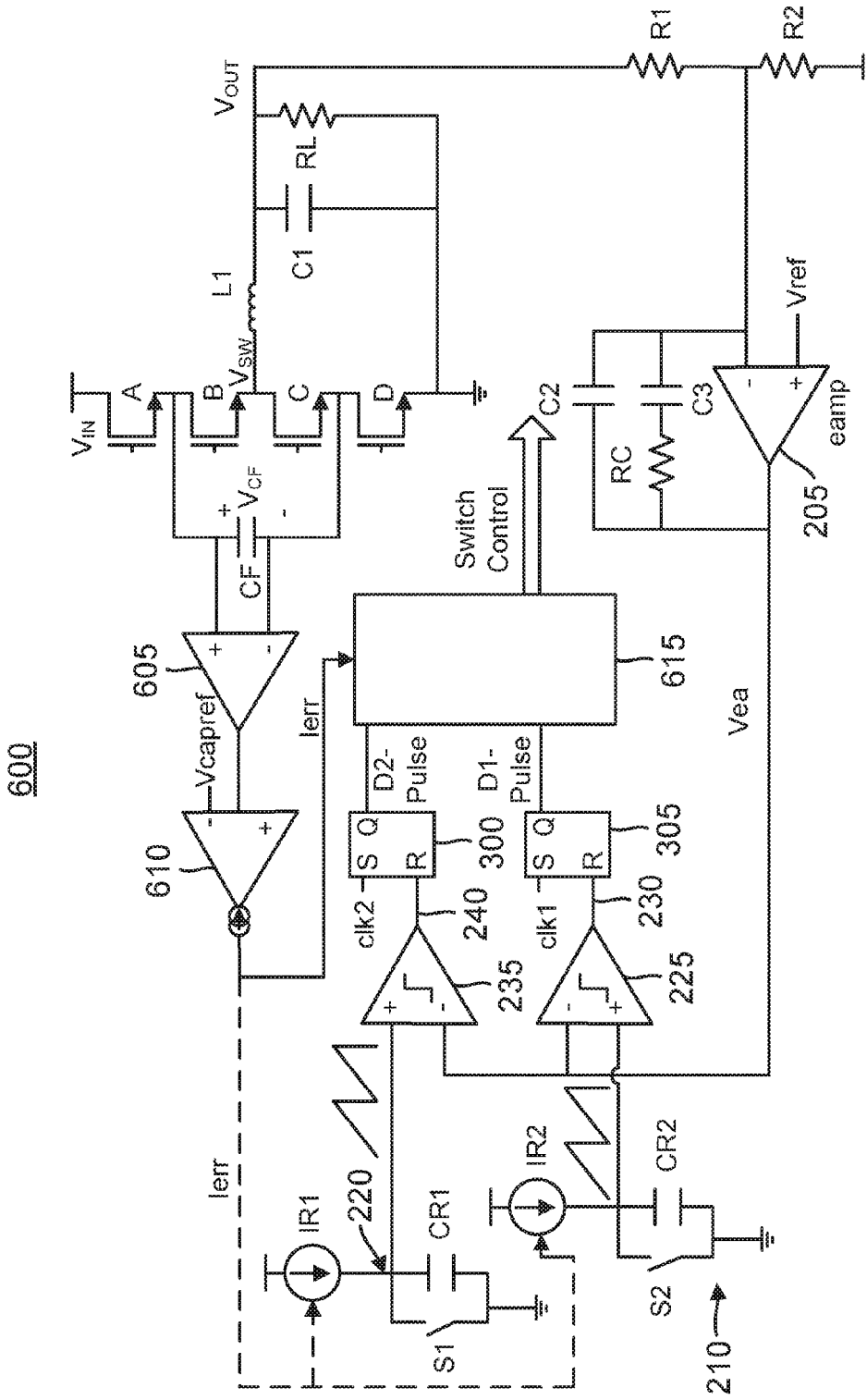
FIG. 6 illustrates a multi-level buck converter configured to regulate its output voltage and its flying capacitor voltage in accordance with an aspect of the disclosure.

The resulting control of the switching states to regulate the output power is advantageously modified to also regulate the flying capacitor voltage at the desired level of V_IN/2. An example multi-level buck converter 600 is shown in FIG. 6. Switch transistors A, B, C, and D, flying capacitor CF, the inductor L1, and the output capacitor C1 are arranged as discussed with regard to multi-level buck converter 200. In addition, the load is represented by a resistance RL. The output voltage is sampled by a voltage divider formed by resistors R1 and R2 so that the sampled output voltage may be compared to the reference voltage Vref in error amplifier 205. The error signal voltage (Vea) from error amplifier 205 is compensated through a loop filter formed by capacitors C2, C3, and resistor RC. It will be appreciated that an analogous loop filter may be used to compensate the error signal in multi-level buck converter 200 of FIG. 2. The error signal voltage is compared at comparators 225 and 235 to form control signals 230 and 240, respectively, as also discussed with regard to FIG. 2. First ramp signal generator 210 includes a current source IR2 that drives a capacitor CR2. The first ramp signal will thus increase in voltage as the current source IR2 charges capacitor CR2. Each ramp signal period for the first ramp signal begins through a switch S2 resetting the voltage on capacitor CR2. Similarly, second ramp signal generator 220 includes a current source IR1 that drives a capacitor CR1 that is reset by a switch S1.

An amplifier 605 monitors the flying capacitor voltage $V_{CF}$ so that it may be compared to a flying capacitor reference voltage (Vcapref) at a transconductance amplifier 610. The output of transconductance amplifier 610 is thus an error current Ierr that represents the error (difference) between the flying capacitor voltage and the flying capacitor reference voltage. It will be appreciated that such an error signal may be a voltage error signal in alternative embodiments. Referring again to FIGS. 4 and 5, note that switching states D1 and D2 are either both magnetizing or both de-magnetizing, depending upon the error signal amplitude. If the sum of both D1 and D2 is maintained constant, the desired output power regulation will thus be achieved. It can be seen from FIG. 1 that the switching state D1 increases the flying capacitor voltage whereas switching state D2 decreases it. Should the flying capacitor voltage be too high, the flying capacitor regulation disclosed herein thus increases the length of switching state D2. But switching state D1 must then be decreased so that the sum of D1 and D2 is maintained constant. To regulate the flying capacitor voltage, the multi-level buck converter 600 thus includes a switch control circuit 615 that modifies the periods for the D1 and D2 switching states responsive to the error current Ierr while leaving the sum of D1 and D2 switching state periods unchanged. To effect this regulation, opposing edges of the D1_pulse and D2_pulse signals may be either delayed or advanced depending upon the sign of the error current Ierr as will be explained further herein.

Rather than adjust the D1_pulse and D2_pulse signals in switch control circuit 615, the ramp signal generation itself may be adjusted as shown in FIG. 6. For example, the two current sources IR1 and IR2 in ramp signal generators 210 and 215 may be configured to respond in a complementary fashion to the error current Ierr. The ramp slope for the two ramp signals is thus adjusted such that rate of increase for one ramp signal is increased while the remaining ramp signal rate of increase is decreased.

The following discussion will be directed to the adjustment of the D1_pulse and D2_pulse signals in switch control circuit 615 as it can be shown that the resulting flying capacitor voltage regulation is advantageously de-coupled from the output power regulation. An example embodiment for switch control circuit 615 is shown in FIG. 7. The D1_pulse signal is delayed by a fixed delay circuit 715 (e.g, a delay of ¼ the period for the first ramp signal) to form a delayed output signal that clocks a flip-flop 720. A Q output of flip-flop 720 (designated as RisingEdgeD1) will thus go high after the ¼ period delay from the rising edge of the D1_pulse signal. The Q output of flip-flop 720 sets an RS latch 740. The Q output of latch 740 is the delayed version of the D1_pulse signal, designated as D1_pulse_delay. The error current Ierr (annotated with a +/− sign since it may be positive or negative depending upon the flying capacitor voltage error) drives a current-controlled delay circuit 700 that has the same nominal delay as fixed delay circuit 715. For example, if the fixed delay is ¼ the ramp period, then the nominal delay for current-controlled delay circuit 700 is ¼ the ramp period. But this nominal delay is either increased or decreased by a factor (designated as delta T) responsive to the error current Ierr to produce an output signal whose falling edge clocks a flip-flop 725. Like flip-flop 720, the data input D of flip-flop 725 is tied to the power supply voltage VDD such that the Q output of flip-flop 725 will go high when flip-flop 725 is clocked. The Q output of flip-flop 725 (designated as FallingEdgeD1) resets latch 740, which is reset dominant to resolve any conflicts between its set and reset commands. The falling edge of the D1_pulse_delay signal will thus either be advanced or delayed relative to its nominal ¼ period delay by the adjustment in current-controlled delay circuit 700. The on time for the D1_pulse_delay signal can thus either be extended or reduced with regard to its rising edge to provide the desired adjustment to the D1 switching state. Latch 740 asserts a Q bar (Q complement) signal when reset that is received by a rising edge triggered one-shot circuit 745. The resulting one-shot pulse from one-shot circuit 745 is received at the clear (CLR) terminal for flips flops 720 and 725 to reset them.

The D2_pulse signal is adjusted to form a delayed version (designated as a D2_pulse_delay signal) in a complementary fashion. Since it was the falling edge that was adjusted for the D1_pulse_delay signal, it is the rising edge for the D2_pulse_delay signal that will either be advanced or delayed with regard to its nominal delay value. The D2_pulse signal is thus received at both a fixed delay circuit 710 and a current-controlled delay circuit 705 that has a matching nominal delay of ¼ the ramp period. Depending upon the error current sign and amplitude, current-controlled delay circuit 705 adjusts the nominal delay by the factor delta T as discussed with regard to current-controlled delay circuit 700. It will be appreciated that the fixed delay of ¼ the ramp period and the matching nominal delay may be either increased or decreased from ¼ the ramp period in alternative embodiments. The output signal of the current-controlled delay circuit 705 is received at the clock input of a flip-flop 730 that asserts a Q output signal (designated as RisingEdgeD2) in response to the rising edge for the output signal from current-controlled delay circuit 705. The RisingEdgeD2 signal sets an SR latch 750 to assert the D2_plus_delay signal. The falling edge for the output signal from fixed delay circuit 710 clocks a flip-flop 735 to assert a FallingEdgeD2 output signal that resets latch 750. In response to the reset, the Q complement output from latch 750 goes high to trigger a one-shot pulse from a rising edge triggered one-shot circuit 755 that resets flip-flops 730 and 735 through their clear inputs. Control and gate drivers circuit 760 includes a logic circuit such as LUT 310 of FIG. 3. The resulting control of the D1, D2, DV, and DP switching states is as discussed with regard to the table above with the replacement of the D1_pulse and D2_pulse signals by the D1_pulse_delay and D2_pulse_delay signals, respectively.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A multi-level buck converter, comprising:
a plurality of switches having four switching states with respect to an inductor and a flying capacitor; and
a first error amplifier configured to produce a first error signal responsive to a difference between an output voltage and a first reference voltage;
a second error amplifier configured to produce a second error signal responsive to a difference between a voltage across the flying capacitor and a second reference voltage; and
a controller configured to generate a first control signal that is asserted at the beginning of each period for a first ramp signal and reset when the first ramp signal exceeds the first error signal and configured to generate a second control signal that is asserted at the beginning of each period for a second ramp signal and is reset when the second ramp signal exceeds the first error signal, wherein the controller is further configured to adjust the assertion of the first control signal and the second control signal responsive to the second error signal to produce an adjusted first control signal and an adjusted second control signal, and wherein the controller includes a logic circuit configured to select for respective ones of the four switching states responsive to a binary value for the adjusted first control signal and for the adjusted second control signal to maintain a regulation for the output voltage and for the voltage across the flying capacitor.

2. The multi-level buck converter of claim 1, further comprising:
a first ramp generator for generating the first ramp signal responsive to a first clock signal; and
a second ramp generator for generating the second ramp signal responsive to a second clock signal, wherein the first ramp signal is 180° out of phase with the second ramp signal.

3. The multi-level buck converter of claim 2, wherein the first ramp generator comprises a first current source configured to charge a first capacitor, and wherein the second ramp generator comprises a second current source configured to charge a second capacitor.

4. The multi-level buck converter of claim 1, further comprising:
a first latch configured to be set responsive to the beginning of each period for the first ramp signal and to be reset responsive to the first ramp signal exceeding the first error signal, wherein the first latch is further configured to produce the first control signal at a Q output; and
a second latch configured to be set responsive to the beginning of each period for the second ramp signal and to be reset responsive to the second ramp signal exceeding the first error signal, wherein the second latch is further configured to produce the second control signal at a Q output.

5. The multi-level buck converter of claim 4, further comprising:
a first comparator configured to compare the first ramp signal to the first error signal to produce a first comparator output signal for resetting the first latch; and
a second comparator configured to compare the second ramp signal to the first error signal to produce a second comparator output signal for resetting the second latch.

6. The multi-level buck converter of claim 4, further comprising:
a fixed delay circuit for delaying the first control signal by a fixed delay to produce a first delayed signal;
a variable delay circuit for delaying the first control signal by a variable delay that equals the fixed delay plus a variable time that is responsive to the second error signal to produce a second delayed signal;
a first flip-flop configured to set a first Q output signal responsive to a rising edge for the first delayed signal;
a second flip-flop configured to set a second Q output signal responsive to a falling edge for the second delayed signal; and
a latch configured to set the adjusted first control signal responsive to the set of the first Q output signal and to reset the adjusted first control signal responsive to the set of the second Q output signal.

7. The multi-level buck converter of claim 6, further comprising:
a rising edge triggered one-shot circuit configured to assert a one-shot pulse signal responsive to the reset of the adjusted first control signal, wherein the first flip-flop and the second flip-flop are each configured to be reset responsive to the one-shot pulse signal.

8. The multi-level buck converter of claim 6, wherein the second error amplifier is a transconductance error amplifier such that the second error signal is a current error signal, and wherein the variable delay circuit is current-controlled variable delay circuit configured to vary the variable time responsive to the current error signal.

9. The multi-level buck converter of claim 4, further comprising:
a fixed delay circuit for delaying the second control signal by a fixed delay to produce a first delayed signal;
a variable delay circuit for delaying the second control signal by a variable delay that equals the fixed delay plus an amount that is responsive to the second error signal to produce a second delayed signal;
a first flip-flop configured to set a first Q output signal responsive to a rising edge for the second delayed signal;
a second flip-flop configured to set a second Q output signal responsive to a falling edge for the first delayed signal; and
a latch configured to set the adjusted second control signal responsive to the set of the first Q output signal and to reset the adjusted second control signal responsive to the set of the second Q output signal.

10. The multi-level buck converter of claim 9, further comprising:
a rising edge triggered one-shot circuit configured to assert a one-shot pulse signal responsive to the reset of the adjusted second control signal, wherein the first flip-flop and the second flip-flop are each configured to be reset responsive to the one-shot pulse signal.

11. The multi-level buck converter of claim 1, wherein the four switching states comprise a first switching state in which the plurality of switches are configured such that an input voltage charges the flying capacitor and charges an input node for the inductor, a second switching state in which the plurality of switches are configured such that the flying capacitor is floating and the inductor is freewheeling, a third switching state in which the plurality of switches are configured such that the flying capacitor discharges to charge the input node for the inductor, and a fourth switching state in which the plurality of switches are configured such that the input voltage charges the input node for the inductor while the flying capacitor floats.

12. The multi-level buck converter of claim 11, wherein the logic circuit is configured to:
select for the first switching state while the adjusted first control signal has a binary high value while the adjusted second control signal has a binary low value;
select for the second switching state while the adjusted first control signal and the adjusted second control signal both have a binary low value;
select for the third switching state while the adjusted first control signal has a binary low value while the adjusted second control signal has a binary high value;
select for the fourth switching state while the adjusted first control signal and the adjusted second control signal both have a binary high value.

13. The multi-level buck converter of claim 12, wherein the logic circuit comprises a look-up table.

14. A method, comprising:
generating a first error signal responsive to a difference between an output voltage for a multi-level buck converter and a first reference voltage;
generating a second error signal responsive to a difference between a flying capacitor voltage for the multi-level buck converter and a second reference voltage;
asserting a first control signal at a beginning of each period for a first ramp signal and resetting the first control signal responsive to the first ramp signal exceeding the first error signal, the first control signal having an on time when asserted;
asserting a second control signal at a beginning of each period for a second ramp signal and resetting the second control signal responsive to the second ramp signal exceeding the first error signal, the second control signal having an on time when asserted and wherein a total on time equals a sum of the on time for the first control signal and the on time for the second control signal;
responsive to the second error signal, adjusting the on time for the first control signal to produce an adjusted first control signal that is periodically asserted for a first on time and then reset and adjusting the on time for the second control signal to produce an adjusted second control signal that is periodically asserted for a second on time and then reset such that a sum of the first on time and the second on time equals the total on time; and
selecting from a plurality of four switching configurations for a plurality of switches for the multi-level buck converter responsive to whether the adjusted first control signal and the adjusted second control signal are asserted or reset to regulate the output voltage and the flying capacitor voltage.

15. The method of claim 14, wherein the regulation of flying capacitor voltage maintains an average value for the flying capacitor voltage to equal one-half on an input voltage for the multi-level buck converter.

16. The method of claim 14, wherein adjusting the on time of the first control signal comprises either advancing or delaying a falling edge for the adjusted first control signal depending upon a sign of the error signal.

17. The method of claim 16, wherein adjusting the on time of the second control signal comprises either advancing or delaying a rising edge for the adjusted second control signal depending upon the sign of the second error signal.

18. The method of claim 14, further comprising:
generating the first ramp signal responsive to a first clock signal; and
generating the second ramp signal responsive to a second clock signal such that the second ramp signal is 180° out of phase with the first ramp signal.

19. The method of claim 14, wherein the selecting from the plurality of four switching configurations includes switching on a first switch and a third switch while switching off a second switch and a fourth switch to charge the flying capacitor voltage and an input node for an inductor responsive to the adjusted first control signal being asserted while the adjusted second control signal is reset.

20. The method of claim 19, wherein the selecting from the plurality of four switching configurations further includes switching off the first switch and the third switch while switching on the second switch and the fourth switch to discharge the flying capacitor voltage into the input node for the inductor responsive to the adjusted first control signal being reset while the adjusted second control signal is asserted.

* * * * *